(12) United States Patent
Mistry et al.

(10) Patent No.: US 12,694,409 B2
(45) Date of Patent: Jul. 28, 2026

(54) SYSTEM, METHOD, AND COMPUTER PROGRAM PRODUCT FOR HOST BASED PURCHASE RESTRICTION

(71) Applicant: Visa International Service Association, San Francisco, CA (US)

(72) Inventors: Adi Mistry, San Francisco, CA (US); William Parker Patton, Jr., Orinda, CA (US); Christoffel Daniel Maurice Brummer, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 18 days.

(21) Appl. No.: 18/692,379

(22) PCT Filed: Sep. 17, 2021

(86) PCT No.: PCT/US2021/050921
§ 371 (c)(1),
(2) Date: Mar. 15, 2024

(87) PCT Pub. No.: WO2023/043455
PCT Pub. Date: Mar. 23, 2023

(65) Prior Publication Data
US 2024/0378621 A1     Nov. 14, 2024

(51) Int. Cl.
G06Q 20/40     (2012.01)
G06Q 20/34     (2012.01)
G06Q 20/20     (2012.01)

(52) U.S. Cl.
CPC ......... G06Q 20/405 (2013.01); G06Q 20/341 (2013.01); G06Q 20/204 (2013.01)

(58) Field of Classification Search
None
See application file for complete search history.

(56) References Cited

U.S. PATENT DOCUMENTS 9,898,730 B2     2/2018 Flitcroft et al.
2008/0017703 A1     1/2008 Lu et al.
(Continued)

FOREIGN PATENT DOCUMENTS

CA          2993933 C      6/2020
WO     2002079911 A2     10/2002

*Primary Examiner* — Gregory S Cunningham, II
(74) *Attorney, Agent, or Firm* — The Webb Law Firm

(57) ABSTRACT

Systems, methods, and computer program products that receive, from a merchant system, an authorization request associated with a transaction at the merchant system using a chip-based payment device storing a chip-based purchase restriction in a chip-card format, the authorization request including a purchase restrictions flag indicating whether the merchant system supports host-based purchase restrictions; determine, based on the purchase restrictions flag, that the merchant system supports host-based purchase restrictions; and transmit, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

12 Claims, 4 Drawing Sheets

(56)        References Cited

U.S. PATENT DOCUMENTS

| | | | | |
|---|---|---|---|---|
| 2009/0044012 | A1 | 2/2009 | Bishop et al. | |
| 2009/0070260 | A1 | 3/2009 | Flitcroft et al. | |
| 2009/0271315 | A1* | 10/2009 | Hammad | G06Q 20/04 |
| | | | | 235/487 |
| 2010/0211504 | A1 | 8/2010 | Aabye et al. | |
| 2012/0284161 | A1 | 11/2012 | Kirch et al. | |
| 2013/0185167 | A1 | 7/2013 | Mestre et al. | |
| 2014/0114857 | A1 | 4/2014 | Griggs et al. | |
| 2015/0186867 | A1 | 7/2015 | Mestre | |
| 2017/0032371 | A1* | 2/2017 | Aquilina | G06Q 20/34 |
| 2017/0116604 | A1* | 4/2017 | Lacoss-Arnold | |
| | | | | G06Q 20/4015 |
| 2017/0357977 | A1 | 12/2017 | Pitz et al. | |
| 2018/0144322 | A1* | 5/2018 | Unnerstall | G07F 13/025 |
| 2018/0268405 | A1 | 9/2018 | Lopez | |
| 2020/0327589 | A1* | 10/2020 | Greenberg | G06Q 20/36 |
| 2020/0410483 | A1 | 12/2020 | Dill et al. | |

* cited by examiner

100

SYSTEM, METHOD, AND COMPUTER PROGRAM PRODUCT FOR HOST BASED PURCHASE RESTRICTION

CROSS-REFERENCE TO RELATED APPLICATION

This application is the United States national phase of International Application No. PCT/US2021/050921 filed Sep. 17, 2021, the entire disclosure of which is hereby incorporated by reference in its entirety.

BACKGROUND

1. Technical Field

This disclosure relates to electronic payment networks and, in some non-limiting embodiments or aspects, to host-based purchase restrictions for electronic payment networks.

2. Technical Considerations

Today's mobile workforce is required to be more flexible and responsive than in the past. Fleet field workers need to pay for a range of travel and mobility costs (including fuel), on-the-road vehicle expenses, emergency supplies, etc. This requires a wider payment acceptance network, incorporating a broader range of merchants, categories, and payment modes than existing closed loop fleet cards can provide.

When an issuer issues fleet chip cards, purchase/product restrictions are part of the chip data tags, and the purchase/product restrictions can only be updated by issuing a new chip card, which involves a fair amount of effort, cost, and process for an issuer and user company to manage and maintain, or through dynamic scripting, which is not recommended as a proven solution.

SUMMARY

Accordingly, provided are improved systems, devices, products, apparatus, and/or methods for host-based purchase restrictions.

According to some non-limiting embodiments or aspects, provided is a computer-implemented method, including: receiving, with at least one processor, from a merchant system, an authorization request associated with a transaction at the merchant system using a chip-based payment device storing a chip-based purchase restriction in a chip-card format, wherein the authorization request includes a purchase restrictions flag indicating whether the merchant system supports host-based purchase restrictions; determining, with the at least one processor, based on the purchase restrictions flag, that the merchant system supports host-based purchase restrictions; and in response to determining that the merchant system supports host-based purchase restrictions, transmitting, with the at least one processor, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

In some non-limiting embodiments or aspects, the authorization request further includes an account identifier, and wherein determining that the merchant supports host-based purchase restrictions includes determining, based on the account identifier, the host-based purchase restriction.

In some non-limiting embodiments or aspects, the chip-based purchase restriction is associated with at least one type of product, wherein the host-based purchase restriction is associated with at least one other type of product, and wherein the at least one type of product is different than the at least one other type of product.

In some non-limiting embodiments or aspects, the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

In some non-limiting embodiments or aspects, the authorization request includes a 0100 message in an ISO 8583 standard format, wherein the authorization response includes a 0110 message in the ISO 8583 standard format, wherein the purchase restrictions flag includes a single character field in the authorization request, and wherein the field including the host-based purchase restriction includes a sixteen character field.

According to some non-limiting embodiments or aspects, provided is a computer-implemented method, including: receiving, with at least one processor, from a chip-based payment device storing a chip-based purchase restriction in a chip-card format, the chip-based purchase restriction; transmitting, with the at least one processor, to an issuer system, an authorization request associated with a transaction using the chip-based payment device, wherein the authorization request includes a purchase restrictions flag indicating that a merchant system supports host-based purchase restrictions; receiving, with the at least one processor, from the issuer system, an authorization response associated with the transaction, wherein the authorization response includes a field including a host-based purchase restriction in the same chip-card format that the chip-based purchase restriction is stored on the chip-based payment device; and overriding, with the at least one processor, the chip-based purchase restriction with the host-based purchase restriction for processing the transaction.

In some non-limiting embodiments or aspects, receiving the chip-based purchase restriction includes reading, with a point-of-sale device, from the chip-based payment device, the chip-based purchase restriction and an account identifier, wherein the authorization request further includes the account identifier.

In some non-limiting embodiments or aspects, the chip-based purchase restriction is associated with at least one type of product, wherein the host-based purchase restriction is associated with at least one other type of product, and wherein the at least one type of product is different than the at least one other type of product.

In some non-limiting embodiments or aspects, the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

In some non-limiting embodiments or aspects, overriding the chip-based purchase restriction with the host-based purchase restriction for processing the transaction includes automatically controlling, with the at least one processor, based on a type of fuel associated with the host-based purchase restriction, a fuel dispensing pump to one of enable and disable dispensing of the type of fuel associated with the host-based purchase restriction.

According to some non-limiting embodiments or aspects, provided is a system, including: at least one processor programmed and/or configured to: receive, from a merchant system, an authorization request associated with a transaction at the merchant system using a chip-based payment device storing a chip-based purchase restriction in a chip-card format, wherein the authorization request includes a purchase restrictions flag indicating whether the merchant system supports host-based purchase restrictions; determine, based on the purchase restrictions flag, that the merchant system supports host-based purchase restrictions; and in response to determining that the merchant system supports host-based purchase restrictions, transmit, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

In some non-limiting embodiments or aspects, the authorization request further includes an account identifier, and wherein the at least one processor is further programmed and/or configured to determine, based on the account identifier, the host-based purchase restriction.

In some non-limiting embodiments or aspects, the chip-based purchase restriction is associated with at least one type of product, wherein the host-based purchase restriction is associated with at least one other type of product, and wherein the at least one type of product is different than the at least one other type of product.

In some non-limiting embodiments or aspects, the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

In some non-limiting embodiments or aspects, the authorization request includes a 0100 message in an ISO 8583 standard format, wherein the authorization response includes a 0110 message in the ISO 8583 standard format, wherein the purchase restrictions flag includes a single character field in the authorization request, and wherein the field including the host-based purchase restriction includes a sixteen character field.

According to some non-limiting embodiments or aspects, provided is a system, including: at least one processor programmed and/or configured to: receive, from a chip-based payment device storing a chip-based purchase restriction in a chip-card format, the chip-based purchase restriction; transmit, to an issuer system, an authorization request associated with a transaction using the chip-based payment device, wherein the authorization request includes a purchase restrictions flag indicating that a merchant system supports host-based purchase restrictions; receive, from the issuer system, an authorization response associated with the transaction, wherein the authorization response includes a field including a host-based purchase restriction in the same chip-card format that the chip-based purchase restriction is stored on the chip-based payment device; and override, the chip-based purchase restriction with the host-based purchase restriction for processing the transaction.

In some non-limiting embodiments or aspects, the system further includes: a point-of-sale device configured to read, from the chip-based payment device, the chip-based purchase restriction and an account identifier, wherein the authorization request further includes the account identifier.

In some non-limiting embodiments or aspects, the chip-based purchase restriction is associated with at least one type of product, wherein the host-based purchase restriction is associated with at least one other type of product, and wherein the at least one type of product is different than the at least one other type of product.

In some non-limiting embodiments or aspects, the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

In some non-limiting embodiments or aspects, the at least one processor is programmed and/or configured to override the chip-based purchase restriction with the host-based purchase restriction for processing the transaction by automatically controlling, based on a type of fuel associated with the host-based purchase restriction, a fuel dispensing pump to one of enable and disable dispensing of the type of fuel associated with the host-based purchase restriction.

Further non-limiting embodiments or aspects are set forth in the following numbered clauses:

Clause 1. A computer-implemented method, comprising: receiving, with at least one processor, from a merchant system, an authorization request associated with a transaction at the merchant system using a chip-based payment device storing a chip-based purchase restriction in a chip-card format, wherein the authorization request includes a purchase restrictions flag indicating whether the merchant system supports host-based purchase restrictions; determining, with the at least one processor, based on the purchase restrictions flag, that the merchant system supports host-based purchase restrictions; and in response to determining that the merchant system supports host-based purchase restrictions, transmitting, with the at least one processor, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

Clause 2. The computer-implemented method of clause 1, wherein the authorization request further includes an account identifier, and wherein determining that the merchant supports host-based purchase restrictions includes determining, based on the account identifier, the host-based purchase restriction.

Clause 3. The computer-implemented method of clauses 1 or 2, wherein the chip-based purchase restriction is associated with at least one type of product, wherein the host-based purchase restriction is associated with at least one other type of product, and wherein the at least one type of product is different than the at least one other type of product.

5

6

Clause 4. The computer-implemented method of any of clauses 1-3, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

Clause 5. The computer-implemented method of any of clauses 1-4, wherein the authorization request includes a 0100 message in an ISO 8583 standard format, wherein the authorization response includes a 0110 message in the ISO 8583 standard format, wherein the purchase restrictions flag includes a single character field in the authorization request, and wherein the field including the host-based purchase restriction includes a sixteen character field.

Clause 6. A computer-implemented method, comprising: receiving, with at least one processor, from a chip-based payment device storing a chip-based purchase restriction in a chip-card format, the chip-based purchase restriction; transmitting, with the at least one processor, to an issuer system, an authorization request associated with a transaction using the chip-based payment device, wherein the authorization request includes a purchase restrictions flag indicating that a merchant system supports host-based purchase restrictions; receiving, with the at least one processor, from the issuer system, an authorization response associated with the transaction, wherein the authorization response includes a field including a host-based purchase restriction in the same chip-card format that the chip-based purchase restriction is stored on the chip-based payment device; and overriding, with the at least one processor, the chip-based purchase restriction with the host-based purchase restriction for processing the transaction.

Clause 7. The computer-implemented method of clause 6, wherein receiving the chip-based purchase restriction includes reading, with a point-of-sale device, from the chip-based payment device, the chip-based purchase restriction and an account identifier, wherein the authorization request further includes the account identifier.

Clause 8. The computer-implemented method of clauses 6 or 7, wherein the chip-based purchase restriction is associated with at least one type of product, wherein the host-based purchase restriction is associated with at least one other type of product, and wherein the at least one type of product is different than the at least one other type of product.

Clause 9. The computer-implemented method of any of clauses 6-8, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

Clause 10. The computer-implemented method of any of clauses 6-9, wherein overriding the chip-based purchase restriction with the host-based purchase restriction for processing the transaction includes automatically controlling, with the at least one processor, based on a type of fuel associated with the host-based purchase restriction, a fuel dispensing pump to one of enable and disable dispensing of the type of fuel associated with the host-based purchase restriction.

Clause 11. A system, comprising: at least one processor programmed and/or configured to: receive, from a merchant system, an authorization request associated with a transaction at the merchant system using a chip-based payment device storing a chip-based purchase restriction in a chip-card format, wherein the authorization request includes a purchase restrictions flag indicating whether the merchant system supports host-based purchase restrictions; determine, based on the purchase restrictions flag, that the merchant system supports host-based purchase restrictions; and in response to determining that the merchant system supports host-based purchase restrictions, transmit, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

Clause 12. The system of clause 11, wherein the authorization request further includes an account identifier, and wherein the at least one processor is further programmed and/or configured to determine, based on the account identifier, the host-based purchase restriction.

Clause 13. The system of clauses 11 or 12, wherein the chip-based purchase restriction is associated with at least one type of product, wherein the host-based purchase restriction is associated with at least one other type of product, and wherein the at least one type of product is different than the at least one other type of product.

Clause 14. The system of any of clauses 11-13, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

Clause 15. The system of any of clauses 11-14, wherein the authorization request includes a 0100 message in an ISO 8583 standard format, wherein the authorization response includes a 0110 message in the ISO 8583 standard format, wherein the purchase restrictions flag includes a single character field in the authorization request, and wherein the field including the host-based purchase restriction includes a sixteen character field.

Clause 16. A system, comprising: at least one processor programmed and/or configured to: receive, from a chip-based payment device storing a chip-based purchase restriction in a chip-card format, the chip-based purchase restriction; transmit, to an issuer system, an authorization request associated with a transaction using the chip-based payment device, wherein the authorization request includes a purchase restrictions flag indicating that a merchant system supports host-based purchase restrictions; receive, from the issuer system, an authorization response associated with the transaction, wherein the authorization response includes a field including a host-based purchase restriction in the same chip-card format that the chip-based purchase restriction is stored on the chip-based payment device; and override, the chip-based purchase restriction with the host-based purchase restriction for processing the transaction.

Clause 17. The system of clause 16, further comprising: a point-of-sale device configured to read, from the chip-based payment device, the chip-based purchase restriction and an account identifier, wherein the authorization request further includes the account identifier.

Clause 18. The system of clauses 16 or 17, wherein the chip-based purchase restriction is associated with at least one type of product, wherein the host-based purchase restriction is associated with at least one other type of product, and wherein the at least one type of product is different than the at least one other type of product.

Clause 19. The system of any of clauses 16-18, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

Clause 20. The system of any of clauses 16-19 wherein the at least one processor is programmed and/or configured to override the chip-based purchase restriction with the host-based purchase restriction for processing the transaction by automatically controlling, based on a type of fuel associated with the host-based purchase restriction, a fuel dispensing pump to one of enable and disable dispensing of the type of fuel associated with the host-based purchase restriction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
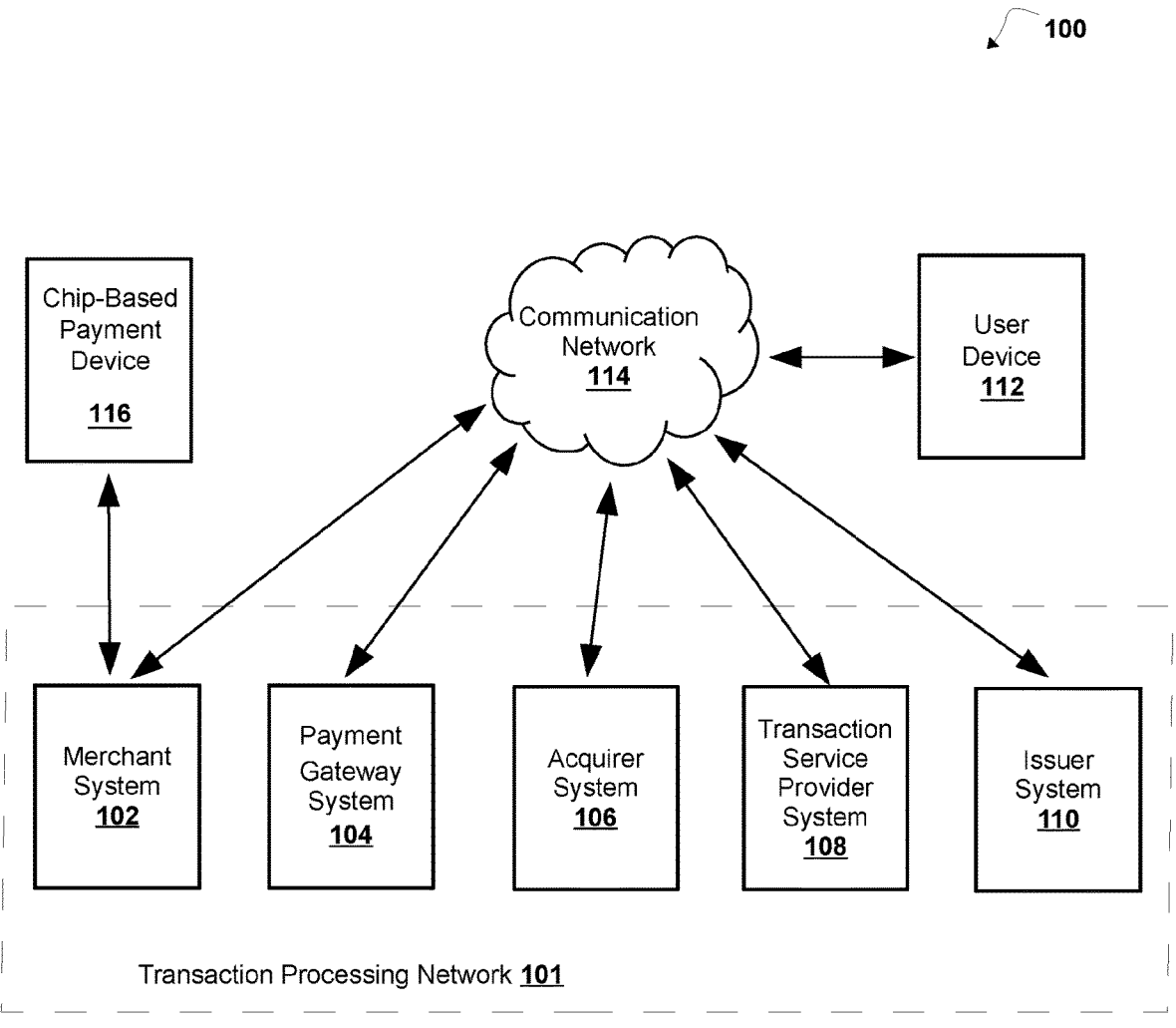
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

It will be apparent that systems and/or methods, described herein, can be implemented in different forms of hardware, firmware, or a combination of hardware and software. Thus, the operation and behavior of the systems and/or methods are described herein without reference to specific software code, it being understood that hardware, firmware, or a combination of hardware and software can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for host-based purchase restrictions that receive, from a merchant system, an authorization request associated with a transaction at the merchant system using a chip-based payment device storing a chip-based purchase restriction in a chip-card format, wherein the authorization request includes a purchase restrictions flag indicating whether the merchant system supports host-based purchase restrictions; determine, based on the purchase restrictions flag, that the merchant system supports host-based purchase restrictions; and in response to determining that the merchant system supports host-based purchase restrictions, transmit, to the merchant system, an authorization response associated with the transaction, wherein the authorization response includes a field including a host-based purchase restriction in the same chip-card format that the chip-based purchase restriction is stored on the chip-based payment device, and wherein the host-based purchase restriction is configured to cause the merchant system to override the chip-based purchase restriction with the host-based purchase restriction for processing the transaction.

Provided are improved systems, devices, products, apparatus, and/or methods for host-based purchase restrictions that receive, from a chip-based payment device storing a chip-based purchase restriction in a chip-card format, the chip-based purchase restriction; transmit, to an issuer system, an authorization request associated with a transaction using the chip-based payment device, wherein the authorization request includes a purchase restrictions flag indicating that a merchant system supports host-based purchase restrictions; receive, from the issuer system, an authorization response associated with the transaction, wherein the authorization response includes a field including a host-based purchase restriction in the same chip-card format that the chip-based purchase restriction is stored on the chip-based payment device; and override, the chip-based purchase restriction with the host-based purchase restriction for processing the transaction.

In this way, an issuer system can provide purchase restrictions back to a merchant system in a single reply (e.g., instead of using multiple ISO messages, etc.) during an authorization response process to override (e.g., update, etc.) purchase restrictions stored in a chip-based payment device, and the merchant system can communicate to the issuer system that they support host-based purchase restrictions via a flag added to an authorization request. For example, an issuer system and/or a Fleet manager can override/update Fleet Chip Card restrictions in an open loop network without issuing a new chip-card, which enables dynamic purchase restrictions during the authorization process. As an example, an issuer system and/or a Fleet manager may offer a "Basic" Chip set of product restrictions and use host-based purchase restrictions to override/update those features for various needs, such as, specific company compliance/monitoring/offering more controls for a subset of the cards, etc.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, communication network 114, and/or chip-based payment device 116. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection.

In some non-limiting embodiments or aspects, user device 112 may include one or more applications associated with user device 112, such as an application stored, installed, and/or executed on user device 112 (e.g., a mobile device application, a native application for a mobile device, a mobile cloud application for a mobile device, an electronic wallet application, a peer-to-peer payment transfer application, a merchant application, an issuer application, etc.).

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Chip-based payment device 116 may include a smart card, also called a chip card, an integrated circuit card, and/or an IC card that stores data on integrated circuit chips, for example, in addition, or alternatively, to magnetic stripes for backward compatibility. For example, chip-based payment device 116 may communicate information and/or data to merchant system 102 (e.g., via a POS device or reader, etc.) by physically inserting or dipping chip-based payment device 116 into the reader and/or by using near-field communication technology that enables contactless cards that can be read over a short distance by the reader. As an example, chip-based payment device 116 may include an Europay, Mastercard, and Visa (EMV) chip card including an EMV chip. For example, chip-based payment device 116 may include a fuel card or a fleet card.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
FIG. 2 is a diagram of non-limiting embodiments or aspects of components of one or more devices and/or one or more systems of FIG. 1.
Figure 2:
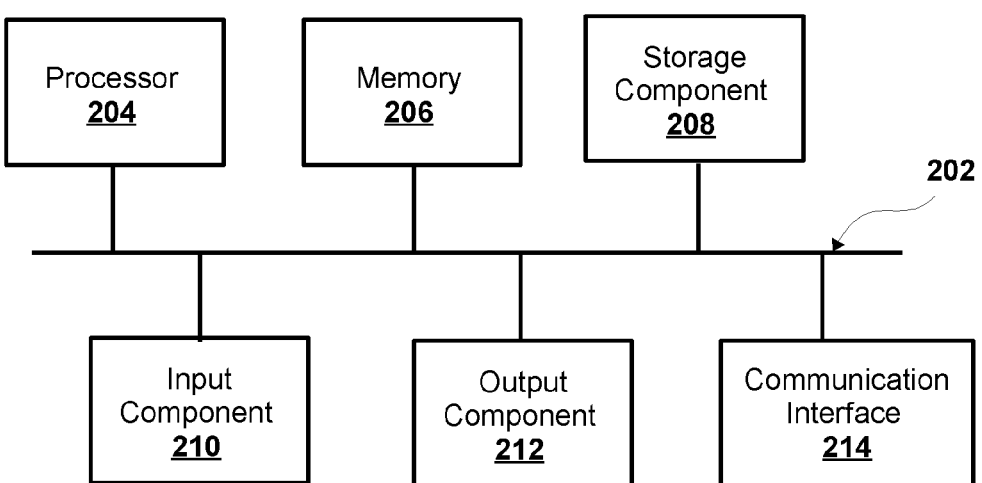

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
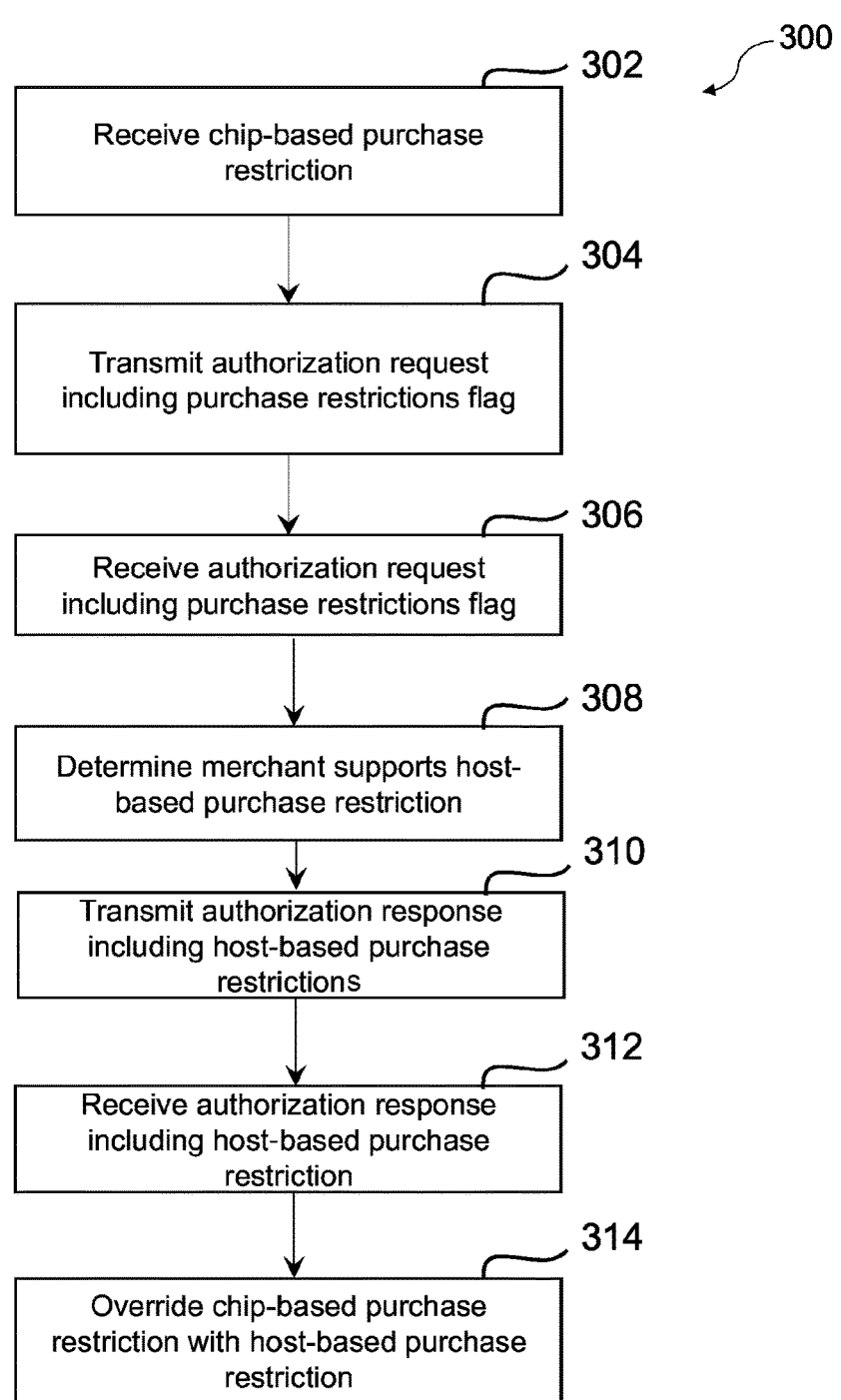
FIG. 3 is a flowchart of non-limiting embodiments or aspects of a process for host-based purchase restrictions.

Referring now to FIG. 3, FIG. 3 is a flowchart of non-limiting embodiments or aspects of a process 300 for dynamic passcode communication. In some non-limiting embodiments or aspects, one or more of the steps of process 300 may be performed (e.g., completely, partially, etc.) by merchant system 102 (e.g., one or more devices of merchant system 102). In some non-limiting embodiments or aspects, one or more of the steps of process 300 may be performed (e.g., completely, partially, etc.) by another device or a group of devices separate from or including merchant system 102, such as, payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 3, at step 302, process 300 includes receiving a chip-based purchase restriction. For example, merchant system 102 may receive, from a chip-based payment device 116 storing a chip-based purchase restriction in a chip-card format, the chip-based purchase restriction. As an example, receiving the chip-based purchase restriction may include reading, with a POS device, from the chip-based payment device, the chip-based purchase restriction and/or an account identifier, wherein the authorization request further includes the account identifier. In such an example, the chip-based payment device 116 may include an Europay, Mastercard, and Visa (EMV) chip card including an EMV chip.

A chip-based purchase restriction may be associated with a type of product (e.g., a product code, etc.). For example, a chip-based purchase restriction may indicate that the type of product is one of a restricted type of product (e.g., instruct a merchant to decline a transaction including a product of the restricted type, etc.) and an unrestricted type of product (e.g., instruct a merchant to approve a transaction including a product of the unrestricted type, etc.). A type of product may include fuel, food and/or drink, clothing, and/or the like, and/or a type of fuel (e.g., diesel fuel, low octane fuel, high octane fuel, etc.), a type of food and/or drink (e.g., alcoholic beverages, non-alcoholic beverages, etc.). In some non-limiting embodiments or aspects, a type of product may be associated with a merchant category code (MCC) code, stock-keeping unit (SKU) code, and/or any other product code used to identify goods and/or services for processing in an electronic payment network. In some non-limiting embodiments or aspects, a chip-based purchase restriction may indicate that each of a plurality of types of products is one of a restricted type and an unrestricted type.

A chip-card format may include a predetermined format for encoding data for storage in a device and/or communication in a network. For example, the chip-card format may include a sixteen character field (e.g., a binary b16 format, an alphanumeric x16 format, etc.). As an example, a chip-card format may include the DF32 chip-card format.

As shown in FIG. 3, at step 304, process 300 includes transmitting an authorization request including a purchase restrictions flag. For example, merchant system 102 (e.g., the POS device, etc.) may transmit, to an issuer system, an authorization request (e.g., a pre-authorization request, an authorization request, etc.) associated with a transaction using the chip-based payment device 116. As an example, the authorization request may include a purchase restrictions flag indicating that merchant system 102 supports host-based purchase restrictions. In such an example, the authorization request may further include the account identifier associated with the chip-based payment device 116 and/or other transaction data including transaction parameters associated with the transaction (e.g., transaction amount, product codes, etc.).

An authorization request may include a pre-authorization request and/or an authorization request. For example, an authorization request may include a 0100 message in the ISO 8583 standard format. In some non-limiting embodiments or aspects, acquirer system 106 may generate the 0100 message in the ISO 8583 standard format based on the authorization request transmitted by merchant system 102 (e.g., based on POS transaction data transmitted to acquirer system 106 including specifics for the purchase restrictions flag, etc.).

A purchase restrictions flag may include a single character field in an authorization message (e.g., a numeric n1 format, an alphanumeric x1 format, etc.). For example, a purchase restrictions flag may include a 1 byte flag in an authorization message 0100, as well as in all related advice and completion messages. As an example, a purchase restrictions flag may identify whether a merchant/acquirer chain (e.g., merchant system 102, acquirer system 106, etc.) supports chip-based purchase restrictions (e.g., DF32 chip-based purchase restrictions, host-based purchase restrictions (e.g., at issuer system 110), each of chip-based purchase restrictions and host-based purchase restrictions, or neither chip-based purchase restrictions nor host-based purchase restrictions.

In such an example, a purchase restrictions flag set equal to zeroes, $Null, spaces, or other values not listed may identify that merchant system 102 does not have a fully enabled Chip POS/Reader and/or nor can merchant system 102 and/or acquirer system 104 support online purchase restrictions. In such an example, a purchase restrictions flag set equal to 1 may identify that merchant system 102 supports chip-based purchase restrictions (e.g., the DF32 restrictions on the chip card only at a fully enabled EMV fuel pump and/or other fully enabled EMV POS device (e.g., merchant system 102 includes a fully enabled Chip POS/Reader, etc.), which means merchant system 102/acquirer system 106 still send an authorization message, but merchant system 102/acquirer system 106 cannot support host-based purchase restrictions coming back from issuer system 110 (e.g., merchant system 102 includes a fully enabled Chip POS/Reader, etc.). In such an example, a purchase restrictions flag set equal to 2 may identify that merchant system 102/acquirer system 106 may receive host-based purchase restrictions (e.g., at a fully enabled EMV fuel pump and/or other fully enabled EMV POS device (e.g., merchant system 102 includes a fully enabled Chip POS/Reader, etc.) in an authorization response (e.g., coming back in a 0110 authorization message, etc.) and that the chip-based purchase restrictions are not considered at all (e.g., merchant system 102 may consider the host-based purchase restrictions only, merchant system 102 does not include a fully enabled Chip POS/Reader, etc.). In such an example, a purchase restrictions flag set equal to 3 may identify that merchant system 102/acquirer system 106 supports each of chip-based purchase restrictions and host-based purchase restrictions (e.g., issuer system 110/host-based purchase restrictions may be used override the chip-based purchase restrictions on the chip card, merchant system 102 includes a fully enabled Chip POS/Reader, etc.). In some non-limiting embodiments or aspects, if merchant system 102 supports chip-based and/or host-based purchase restrictions, but acquirer system 106 does not support chip-based and/or host-based purchase restrictions, acquirer system 106 may downgrade the value in the purchase restrictions flag.

As shown in FIG. 3, at step 306, process 300 includes receiving an authorization request including a purchase restrictions flag. For example, issuer system 110 may receive, from merchant system 102, the authorization request associated with the transaction at merchant system 102 using the chip-based payment device 116 storing the chip-based purchase restriction in the chip-card format. As an example, the authorization request may include the purchase restrictions flag indicating whether merchant system 102 supports host-based purchase restrictions. In such an example, the authorization request may further include the account identifier associated with the chip-based payment device 116.

As shown in FIG. 3, at step 308, process 300 includes determining whether a merchant supports host-based purchase restrictions. For example, issuer system 110 may determine, based on the purchase restrictions flag, whether the merchant system supports host-based purchase restrictions. As an example, a purchase restrictions flag may identify to issuer system 110 whether a merchant/acquirer chain (e.g., merchant system 102, acquirer system 106, etc.) supports chip-based purchase restrictions (e.g., DF32 chip-based purchase restrictions, host-based purchase restrictions (e.g., at issuer system 110), each of chip-based purchase restrictions and host-based purchase restrictions, or neither chip-based purchase restrictions nor host-based purchase restrictions. In such an example, issuer system 110 may determine, based on the purchase restrictions flag, that merchant system 102 supports host-based purchase restrictions.

In some non-limiting embodiments or aspects, determining that merchant system 102 supports host-based purchase restrictions may include determining, based on the account identifier, the host-based purchase restriction associated with that account identifier. For example, issuer system 110 may store the account identifier in a database in association with the host-based purchase restriction (e.g., in a look-up table, etc.). As an example, issuer system 110 may store a plurality of different account identifiers (e.g., PANs, BINs, etc.) in association with a plurality of different host-based purchase restrictions.

As shown in FIG. 3, at step 310, process 300 includes transmitting an authorization response including a host-based purchase restriction. For example, in response to determining that merchant system 102 supports host-based purchase restrictions, issuer system 110 may transmit, to merchant system 102, an authorization response associated with the transaction. As an example, the authorization response may include the host-based purchase restriction associated with the account identifier. In such an example, an authorization response may include a 0110 authorization response message in the ISO 8583 standard format.

An authorization response may include a field including the host-based purchase restriction in the same chip-card format that the chip-based purchase restriction is stored on the chip-based payment device 116. For example, the field including the host-based purchase restriction may include a sixteen character field (e.g., a binary b16 format, an alpha-numeric x16 format, etc.). As an example, the host-based purchase restriction may be encoded in the same predetermined format as the chip-card format (e.g., the DF32 chip-card format, etc.). In such an example, values in the field may include a string (e.g., a hexadecimal string, such as: "46800000000000E0", a sixteen byte binary field including the host-based purchase restriction stored in a first 8 bytes binary with the second 8 bytes binary available for additional/other purposes, etc.), and the string may include the actual coding to replace any chip-based purchase restriction obtained from the chip-based payment device 116 by merchant system 102. For example, the host-based purchase restriction may be configured to cause the merchant system to override the chip-based purchase restriction with the host-based purchase restriction for processing the transaction. As an example, if a host-based purchase restriction is not sent back by issuer system 110 to merchant system 102, the chip-based purchase restriction may be used by merchant system 102 for processing the transaction. As an example, if a host-based purchase restriction is sent back by issuer system 110 to merchant system 102, the host-based purchase restriction may be used by merchant system 102 for processing the transaction. As an example, if the host-based purchase restrictions Detail is sent back by the Issuer to the Merchant—the product restrictions defined by the host-based purchase restriction override the restrictions on the chip (unless a purchase restrictions byte and/or bit, therein, is specifically set to always apply any chip-based purchase restrictions on the chip-based payment device 116).

As shown in FIG. 3, at step 312, process 300 includes receiving an authorization response including a host-based purchase restriction. For example, merchant system 102 (e.g., the POS device, etc.) may receive, from issuer system 110, the authorization response associated with the transaction. As an example, the authorization response may include the field including the host-based purchase restriction in the same chip-card format that the chip-based purchase restriction is stored on the chip-based payment device 116.

In some non-limiting embodiments or aspects, the chip-based purchase restriction is associated with at least one type of product, the host-based purchase restriction is associated with at least one other type of product, and the at least one type of product is different than the at least one other type of product. For example, the chip-based purchase restriction may indicate that food and/or drink is restricted, but not include any product restriction associated with lottery tickets, and the host-based purchase restriction may indicate that lottery tickets are restricted.

In some non-limiting embodiments or aspects, the chip-based purchase restriction indicates that at least one type of product is one of a restricted type of product and an unrestricted type of product, and the host-based purchase restriction indicates that the at least one type of product is the other one of the restricted type of product and the unrestricted type of product. For example, the chip-based purchase restriction may indicate that food and/or drink is restricted, and the host-based purchase restriction may indicate that food and/or drink is unrestricted.

As shown in FIG. 3, at step 314, process 300 includes overriding a chip-based purchase restriction with a host-based purchase restriction. For example, merchant system 102 (e.g., the POS device, etc.) may override the chip-based purchase restriction with the host-based purchase restriction for processing the transaction. As an example, merchant system 102 may use the host-based purchase restriction for processing the transaction instead of the chip-based purchase restriction. In such an example, merchant system 102 may approve the transaction if the transaction includes only unrestricted types of products, and merchant system 102 may decline the transaction if the transaction includes restricted types of products. In some non-limiting embodiments or aspects, the chip-based purchase restriction may initially instruct merchant system 102 to decline (or vice-versa approve) a transaction including one or more types of products, but the host-based purchase restriction may instruct merchant system 102 to approve (or vice-versa decline) a transaction including the one or more types of products.

In some non-limiting embodiments or aspects, merchant system 102 may override the chip-based purchase restriction with the host-based purchase restriction for processing the transaction by automatically controlling, based on a type of fuel associated with the host-based purchase restriction, a fuel dispensing pump to one of enable and disable dispensing of the type of fuel associated with the host-based purchase restriction. For example, the chip-based purchase restriction may initially instruct merchant system 102 to disable dispensing of a particular type of fuel (e.g., a high octane fuel, etc.) from a fuel dispensing pump, but the host-based purchase restriction may instruct merchant system 102 to enable dispensing of the particular type of fuel (e.g., a high octane fuel, etc.) from the fuel dispensing pump.

Figure 4:
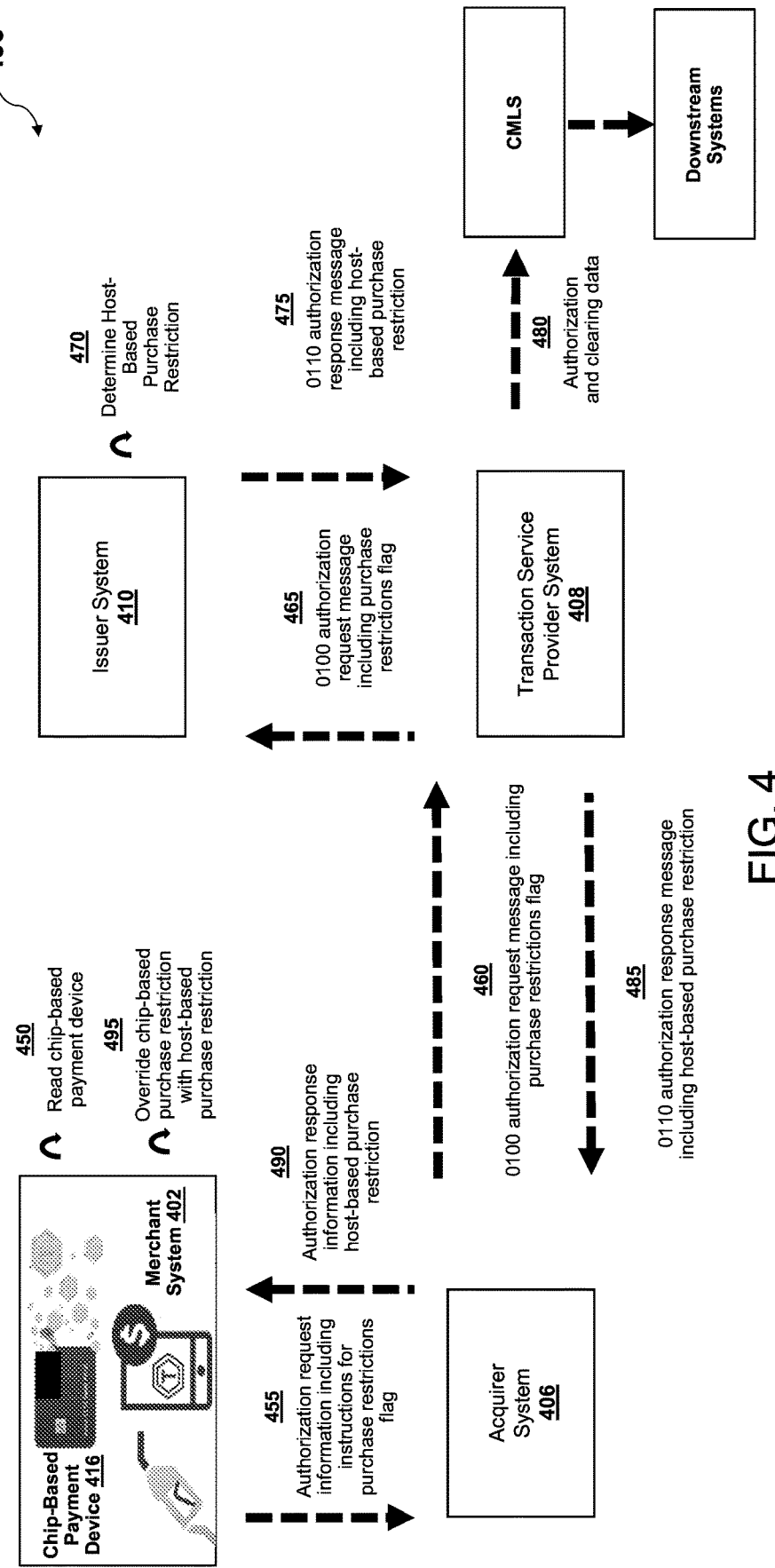
FIG. 4 is a signal flow diagram of an implementation of non-limiting embodiments or aspects of a process for host-based purchase restrictions.

Referring now to FIG. 4, FIG. 4 is signal flow diagram of an overview of a non-limiting embodiment or aspect of an implementation 400 relating to a process for host-based purchase restrictions. As shown in FIG. 4, implementation 400 includes merchant system 402, acquirer system 406, transaction service provider system 408, issuer system 410, and/or chip-based payment device 416. In some non-limiting embodiments or aspects, merchant system 402 can be the same as or similar to merchant system 102. In some non-limiting embodiments or aspects, acquirer system 406 can be the same as or similar to acquirer system 106. In some non-limiting embodiments or aspects, transaction service provider system 408 can be the same as or similar to transaction service provider system 108. In some non-limiting embodiments or aspects, issuer system 410 can be the same as or similar to issuer system 110. In some non-limiting embodiments or aspects, chip-based payment device 416 can be the same as or similar to chip-based payment device 116.

As shown by reference number 450 in FIG. 4, merchant system 402 may read chip-based payment device 416 (e.g., an EMV chip card and mobile wallet, etc.) to retrieve an account identifier and/or a chip-based purchase restriction stored in chip-based payment device 416 for processing a transaction associated with chip-based payment device 416.

As shown by reference number 455 in FIG. 4, merchant system 402 may transmit an authorization request/POS transaction information (e.g., an account identifier, etc.) including specifics or instructions for setting a purchase restrictions flag.

As shown by reference number 460 in FIG. 4, acquirer system 406 may transmit a 0100 authorization request message to transaction service provider system 408. For example, the 0100 authorization request message may include the purchase restrictions flag indicating what purchase restrictions merchant system 402 supports and the account identifier associated with chip-based payment device 416.

As shown by reference number 465 in FIG. 4, transaction service provider system 408 forwards the 0100 authorization request message including the purchase restrictions flag and the account identifier to issuer system 410.

As shown by reference number 470 in FIG. 4, issuer system 410 may determine, based on the purchase restrictions flag, whether merchant system 402 supports host-based purchase restrictions, and, if merchant system 402 supports host-based purchase restrictions, determine a host-based purchase restriction associated with the account identifier.

As shown by reference number 475 in FIG. 4, issuer system 410 may transmit a 0110 authorization response message to transaction service provider system 408. For example, the 0110 authorization response message may include the host-based purchase restriction. As an example, the 0110 authorization response message may include a field including the host-based purchase restriction in a same chip-card format that the chip-based purchase restriction is stored on chip-based payment device 416.

As shown by reference number 480 in FIG. 4, transaction service provider system 408 transmits authorization and clearing data to CMLS and/or other downstream systems.

As shown by reference number 485 in FIG. 4, transaction service provider system 408 forwards the 0110 authorization response message including the host-based purchase restriction to acquirer system 406.

As shown by reference number 490 in FIG. 4, acquirer system 406 transmits authorization response information including the host-based purchase restriction to merchant system 402.

As shown by reference number 495 in FIG. 4, merchant system 402 may override the chip-based purchase restriction stored in chip-based payment device 416 with the host-based purchase restriction received from issuer system 410 for processing the transaction associated with chip-based payment device 416.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:

receiving, with at least one processor of an issuer system in an electronic payment network, from a point-of-sale (POS) device of a merchant system in the electronic payment network, an authorization request including a 0100 message in an ISO 8583 standard format associated with a transaction at the merchant system using a chip-based payment device storing a chip-based purchase restriction in a chip-card format, wherein the chip-card format includes a sixteen character field, and wherein the authorization request includes (i) an account identifier and (ii) a purchase restrictions flag including a single character field in the authorization request and having a value indicating whether the merchant system supports host-based purchase restrictions;

determining, with the at least one processor of the issuer system in the electronic payment network, based on the purchase restrictions flag, that the merchant system supports host-based purchase restrictions;

determining, with the at least one processor of the issuer system in the electronic payment network, based on the account identifier, a host-based purchase restriction associated with the account identifier by accessing a database storing a plurality of account identifiers in association with a plurality of host-based purchase restrictions;

in response to determining that the merchant system supports host-based purchase restrictions, transmitting, with the at least one processor of the issuer system in the electronic payment network, to the merchant system, an authorization response including a 0110 authorization response message in the ISO 8583 standard format associated with the transaction, wherein the authorization response includes a field including the sixteen character field including the host-based purchase restriction encoded as a string in the same chip-card format that the chip-based purchase restriction is stored on the chip-based payment device, wherein the string includes coding to replace any chip-based purchase restriction obtained from the chip-based payment device by the merchant system, and wherein the host-based purchase restriction is configured to cause the merchant system to override the chip-based purchase restriction with the host-based purchase restriction for processing the transaction and to authorize or deny, based on the host-based purchase restriction, the transaction in the electronic payment network, including automatically controlling, based on a type of fuel associated with the host-based purchase restriction, a fuel dispensing pump to one of enable and disable dispensing of the type of fuel associated with the host-based purchase restriction.

2. The computer-implemented method of claim 1, wherein the chip-based purchase restriction is associated with at least one type of product, wherein the host-based purchase restriction is associated with at least one other type of product, and wherein the at least one type of product is different than the at least one other type of product.

3. The computer-implemented method of claim 1, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

4. A computer-implemented method, comprising:

reading, with at least one processor of a point-of-sale (POS) device of merchant system in an electronic payment network, from a chip-based payment device storing a chip-based purchase restriction in a chip-card format, the chip-based purchase restriction and an account identifier, wherein the chip card format includes a sixteen character field;

transmitting, with the at least one processor of the POS device, to an issuer system in the electronic payment network, an authorization request including a 0100 message in an ISO 8583 standard format associated with a transaction using the chip-based payment device at the merchant system, wherein the authorization request includes (i) the account identifier and (ii) a purchase restrictions flag including a single character field in the authorization request and having a value indicating whether the merchant system supports host-based purchase restrictions;

receiving, with the at least one processor of the POS device, from the issuer system, an authorization response including a 0110 message in the ISO 8583 standard format associated with the transaction, wherein the authorization response includes a field including the sixteen character field including the host-based purchase restriction encoded as a string in the same chip-card format that the chip-based purchase restriction is stored on the chip-based payment device, and wherein the string includes coding to replace any chip-based purchase restriction obtained from the chip-based payment device by the merchant system;

in response to receiving the authorization response including the host-based purchase restriction, overriding, with the at least one processor of the POS device, the chip-based purchase restriction with the host-based purchase restriction for processing the transaction by applying the coding in the string to replace the chip-based purchase restriction, including automatically controlling, based on a type of fuel associated with the host-based purchase restriction, a fuel dispensing pump to one of enable and disable dispensing of the type of fuel associated with the host-based purchase restriction; and authorizing or denying, with the at least one processor of the POS device, based on the host-based purchase restriction, the transaction in the electronic payment network.

5. The computer-implemented method of claim 4, wherein the chip-based purchase restriction is associated with at least one type of product, wherein the host-based purchase restriction is associated with at least one other type of product, and wherein the at least one type of product is different than the at least one other type of product.

6. The computer-implemented method of claim 4, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

7. A system, comprising:

at least one processor of an issuer system in an electronic payment network programmed and/or configured to:

receive, from a point-of-sale (POS) device of a merchant system in the electronic payment network, an authorization request including a 0100 message in an ISO 8583 standard format associated with a transaction at the merchant system using a chip-based payment device storing a chip-based purchase restriction in a chip-card format, wherein the chip-card format includes a sixteen character field, and wherein the authorization request includes (i) an account identifier and (ii) a purchase restrictions flag including a single character field in the authorization request and having a value indicating whether the merchant system supports host-based purchase restrictions;

determine, based on the purchase restrictions flag, that the merchant system supports host-based purchase restrictions;

determine, based on the account identifier, a host-based purchase restriction associated with the account identifier by accessing a database storing a plurality of account identifiers in association with a plurality of host-based purchase restrictions;

in response to determining that the merchant system supports host-based purchase restrictions, transmit, to the merchant system, an authorization response including a 0110 authorization response message in the ISO 8583 standard format associated with the transaction, wherein the authorization response includes a field including the sixteen character field including the host-based purchase restriction encoded as a string in the same chip-card format that the chip-based purchase restriction is stored on the chip-based payment device, wherein the string includes coding to replace any chip-based purchase restriction obtained from the chip-based payment device by the merchant system, and wherein the host-based purchase restriction is configured to cause the merchant system to override the chip-based purchase restriction with the host-based purchase restriction for processing the transaction and to authorize or deny, based on the host-based purchase restriction, the transaction in the electronic payment network, including automatically controlling, based on a type of fuel associated with the host-based purchase restriction, a fuel dispensing pump to one of enable and disable dispensing of the type of fuel associated with the host-based purchase restriction.

8. The system of claim 7, wherein the chip-based purchase restriction is associated with at least one type of product, wherein the host-based purchase restriction is associated with at least one other type of product, and wherein the at least one type of product is different than the at least one other type of product.

9. The system of claim 7, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

10. A system, comprising:

at least one processor of a point-of-sale (POS) device of a merchant system in an electronic payment network programmed and/or configured to:

read, from a chip-based payment device storing a chip-based purchase restriction in a chip-card format, the chip-based purchase restriction and an account identifier, wherein the chip card format includes a sixteen character field;

transmit, to an issuer system in the electronic payment network, an authorization request including a 0100 message in an ISO 8583 standard format associated with a transaction using the chip-based payment device at the merchant system, wherein the authorization request includes (i) the account identifier and (ii) a purchase restrictions flag including a single character field in the authorization request and having a value indicating whether the merchant system supports host-based purchase restrictions;

receive, from the issuer system, an authorization response including a 0110 message in the ISO 8583 standard format associated with the transaction, wherein the authorization response includes a field including the sixteen character field including a host-based purchase restriction encoded as a string in the same chip-card format that the chip-based purchase restriction is stored on the chip-based payment device, and wherein the string includes coding to replace any chip-based purchase restriction obtained from the chip-based payment device by the merchant system;

override, the chip-based purchase restriction with the host-based purchase restriction for processing the transaction by applying the coding in the string to replace the chip-based purchase restriction, including automatically controlling, based on a type of fuel associated with the host-based purchase restriction, a fuel dispensing pump to one of enable and disable dispensing of the type of fuel associated with the host-based purchase restriction; and authorize or deny, based on the host-based purchase restriction, the transaction in the electronic payment network.

11. The system of claim 10, wherein the chip-based purchase restriction is associated with at least one type of product, wherein the host-based purchase restriction is associated with at least one other type of product, and wherein the at least one type of product is different than the at least one other type of product.

12. The system of claim 10, wherein the chip-based purchase restriction indicates that at least one type of product is one of a restricted type of product and an unrestricted type of product, and wherein the host-based purchase restriction indicates that the at least one type of product is the other one of the restricted type of product and the unrestricted type of product.

* * * * *